United States Patent [19]

Kosaka et al.

[11] Patent Number: 5,118,329
[45] Date of Patent: Jun. 2, 1992

[54] PROCESS FOR RECOVERING A HYDROPHOBIC ORGANIC COMPOUND BY ABSORPTION AND DESORPTION WITH A CHEMICALLY ACTIVATED SHAPED CARBON

[75] Inventors: Hiroaki Kosaka, Kobe; Hideo Hirota, Sennan; Yoshinori Iwashima, Suita, all of Japan

[73] Assignee: Takeda Chemical Industries, Ltd., Osaka, Japan

[21] Appl. No.: 699,953

[22] Filed: May 14, 1991

Related U.S. Application Data

[62] Division of Ser. No. 409,864, Sep. 7, 1989, Pat. No. 5,039,651.

[30] Foreign Application Priority Data

Sep. 7, 1988 [JP] Japan ............... 63-225254
Aug. 10, 1989 [JP] Japan ............... 1-208987

[51] Int. Cl.⁵ .................................... B01D 53/04
[52] U.S. Cl. ......................... 55/59; 55/74; 55/387
[58] Field of Search ............ 55/59, 61, 74, 387

[56] References Cited

U.S. PATENT DOCUMENTS

| | | | |
|---|---|---|---|
| 1,418,363 | 6/1922 | Coggeshall et al. | 55/59 X |
| 2,508,474 | 5/1950 | Slyh et al. | |
| 4,046,525 | 9/1977 | Matsuo et al. | 55/59 |
| 4,282,015 | 8/1981 | Bartoschek et al. | 55/387 X |
| 4,289,505 | 9/1981 | Hardison et al. | 55/59 |
| 4,377,396 | 3/1983 | Krauss et al. | 55/59 |
| 4,381,929 | 5/1983 | Mizuno et al. | 55/387 X |
| 4,386,947 | 6/1983 | Mizuno et al. | 55/387 |
| 4,414,003 | 11/1983 | Blaudszun | 55/59 X |
| 4,677,086 | 6/1987 | McCue et al. | 55/387 X |
| 4,750,465 | 6/1988 | Rediker, Jr. et al. | 55/387 X |
| 4,820,681 | 4/1989 | Chang et al. | 55/74 X |
| 4,859,216 | 8/1989 | Fritsch | 55/74 X |
| 4,999,330 | 3/1991 | Bose et al. | 55/74 X |
| 5,015,365 | 5/1991 | Vara et al. | 55/61 X |

FOREIGN PATENT DOCUMENTS 50-039635 12/1975 Japan.

Primary Examiner—Robert Spitzer
Attorney, Agent, or Firm—Wenderoth, Lind & Ponack

[57] ABSTRACT

Process of recovering a hydrophobic organic compound(s) by contacting a chemically activated shaped carbon with a hydrophobic organic compound to repeatedly absorb and desorb the compound, thereby recovering the same. The activated carbon is such that it has a bulk density of 0.25 to 0.6 g/cm³, a pore volume of 0.65 to 1.2 cm³/g, a bulk density × pore volume of 0.25 to 0.4 cm³/cm³, a surface area of at least 1000 m²/g, a mean pore size of 18 to 35 angstroms, a bulk density × surface area of at least 400 m²/cm³, and which chemically activated carbon effectively adsorbs butane in an amount of 8.0 to 15 g/100 ml. The process is especially suitable for absorbing gasoline vapor in an automobile exhaust and releasing the absorbed gasoline for reuse in the operation of the engine.

1 Claim, 2 Drawing Sheets

➡➡➡ : 8

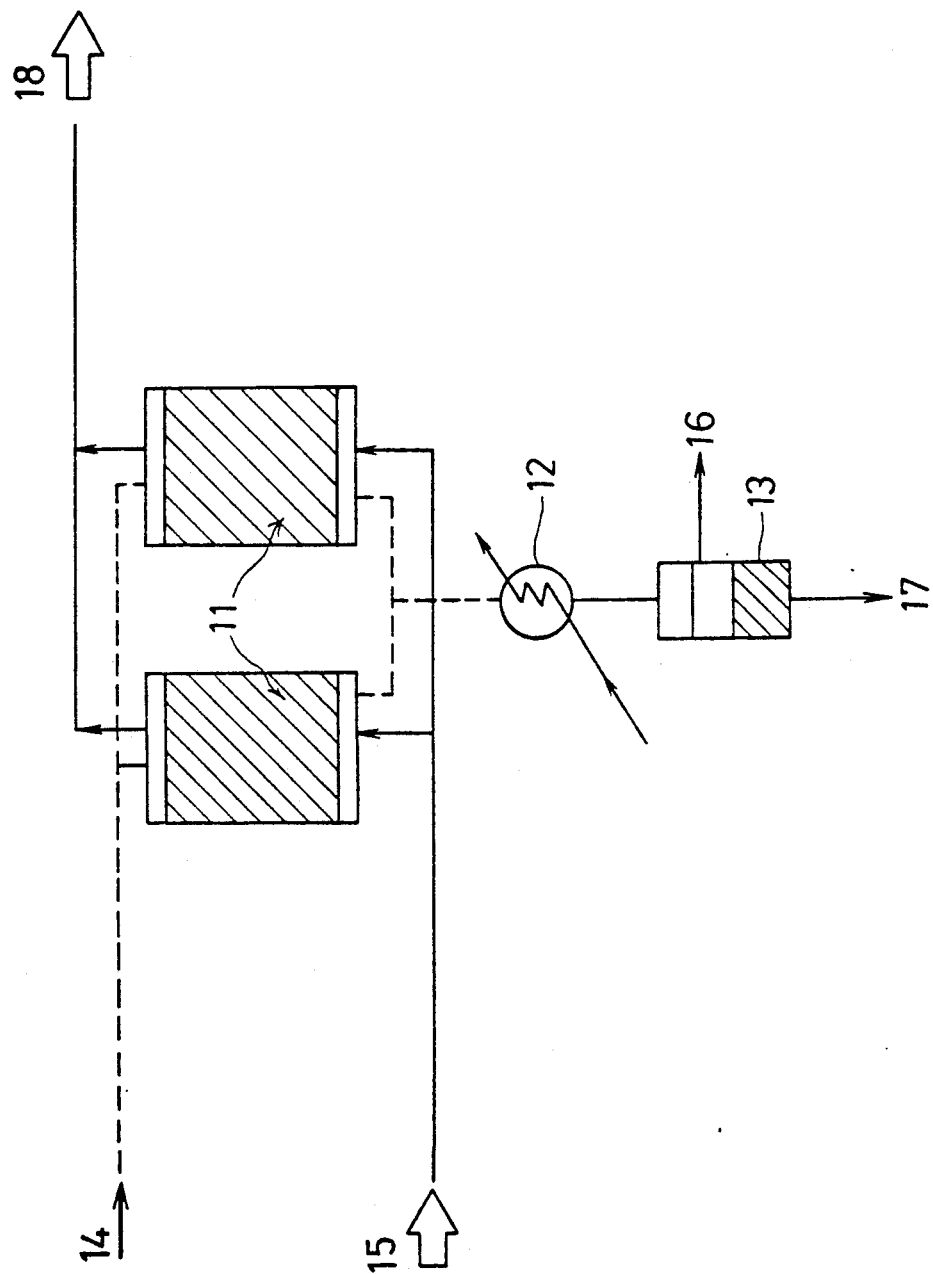

PROCESS FOR RECOVERING A HYDROPHOBIC ORGANIC COMPOUND BY ABSORPTION AND DESORPTION WITH A CHEMICALLY ACTIVATED SHAPED CARBON

This is a divisional application of U.S. application Ser. No. 07/409,864, filed Sept. 7, 1989, now U.S. Pat. No. 5,039,650.

BACKGROUND OF THE INVENTION

1. Field of the Invention

The present invention relates to a chemically activated shaped carbon, a process for producing the activated carbon and use thereof.

2. Description of the Prior Art

It has been conventional practice to recover organic solvents from gases containing the organic solvent as vaporized, by passing the gas through a layer of shaped activated carbon to cause the carbon to adsorb the organic solvent, and thereafter heating the active carbon layer to desorb the adsorbed solvent.

When gasoline engines for motor vehicles are stopped during driving, the heat of the engine operating at a high temperature is released to the environment to bring about a so-called hot-soaked state, permitting evaporation of gasoline. An active carbon layer is used for adsorbing the gasoline vapor and releasing the adsorbed gasoline for reuse for the operation of the engine.

It is desired that the activated carbon for use in these activated carbon layers be shaped carbon having high working capacity (the amount of effective adsorption) and high durability.

However, the conventional activated carbon for such uses is still unsatisfactory in the amount of effective adsorption, physical strength, etc.

Examined Japanese Patent Publication SHO 50-39635 discloses shaped activated carbon for adsorbing heavy metal ions, such as chromium ion, contained in waste liquids. The disclosed carbon is one obtained by chemically activating an organic material such as lauan flour with phosphric acid. U.S. Pat. No. 2,508,474 discloses chemically activated granular carbon, which is suitable for use as gas mask adsorbent. However, both references do not disclose specifically the physical properties of the product obtained. Further, both references do not disclose that the activated carbon obtained can be used for the adsorption and desorption cycle of gases.

SUMMARY OF THE INVENTION

The main object of the present invention is to provide shaped activated carbon suitable for adsorbing and desorbing hydrophobic organic compounds and having high working capacity and high durability, a process for industrially advantageously producing such shaped activated carbon by the chemical activation method, and uses thereof.

Accordingly, the present invention provides a chemically activated shaped carbon suitable for adsorbing and desorbing hydrophobic organic compounds and having the properties of 0.25 to 0.6 g/cm$^3$ in bulk density, 0.5 to 1.2 cm$^3$/g in pore volume, 0.25 to 0.4 cm$^3$/cm$^3$ in bulk density $\times$ pore volume, at least 1000 m$^2$/g in surface area, at least 400 m$^2$/cm$^3$ in bulk density $\times$ surface area, 18 to 35 angstroms in mean pore size and 5.0 to 15 g/100 ml in the effective amount of adsorption of butane. The present invention further provides a process for producing a chemically activated shaped carbon which comprises heating and reacting at 100° to 160° C. a mixture of a chemically activatable starting material and 40 to 70% aqueous solution of a chemical in a ratio of 1/0.6 to 1/3.0 by dry weight of their respective solid, shaping the reaction mixture at a temperature of 90° to 160° C. when a total weight of the reaction mixture has become 90 to 115% of a dry weight of solids in the mixture before heating, and thereafter calcining, washing and drying the shaped product by conventional methods to obtain a shaped activated carbon.

According to the present invention, various materials can be made into shaped activated carbons which are great in the amount of effective adsorption per unit volume, outstanding in durability and suitable for adsorbing and desorbing hydrophobic organic compounds.

The shaped activated carbon of the present invention is suited to the recovery of hydrophobic organic compounds and is desirable, for example, for use in gasoline evaporation preventing devices (Evaporated Loss Control Device; ELCD) and the like.

BRIEF DESCRIPTION OF THE DRAWINGS

FIG. 2 is a flow chart illustrating the basic feature of a solvent recovery process as another example in which the present shaped activated carbon is used.

DESCRIPTION OF THE PREFERRED EMBODIMENTS

Figure 1A:
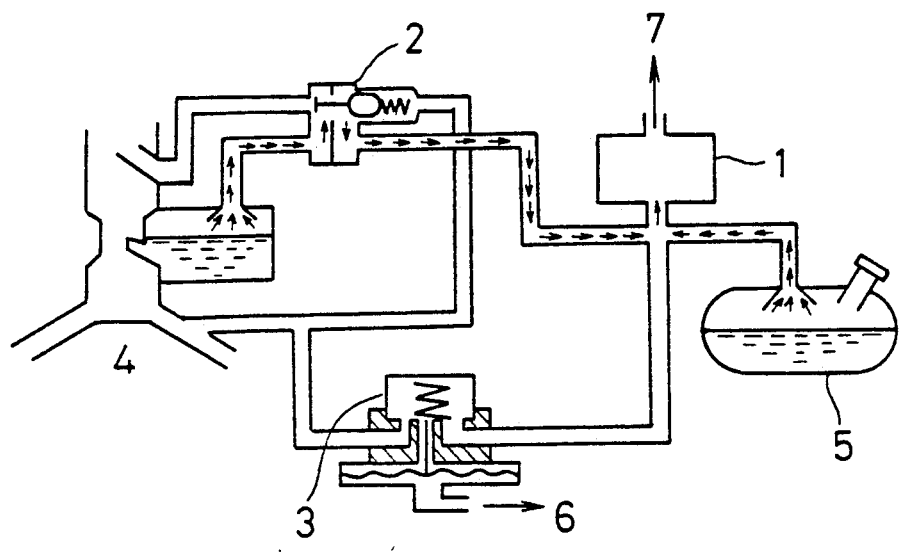
FIG. 1 shows the principle of operation of a gasoline evaporation preventing device as an example in which the shaped activated carbon of the invention is used, diagram (a) showing the device during adsorption and diagram (b) showing the same during desorption.

The starting carbon material to be used in the present invention is a chemically activatable material. Examples of such materials are cellulosic materials (e.g., wood chips and coconut shells) and starch materials (e.g., cereals including corn, millet, foxtail millet and barnyard millet). Of these, cellulosic materials are desirable. Examples of chemicals useful for the chemical activation method are those generally used for activation, such as phosphoric acid, zinc chloride, calcium chloride and the like, among which zinc chloride and phosphoric acid are desirable. Zinc chloride is more desirable.

The term "bulk density" as used herein for the shaped activated carbon of the invention refers to the bulk density of 10- to 28-mesh (according to old JIS abolished in Mar. 1987) shaped activated carbon as determined according to the method of JIS K 1474. The shaped activated carbon of the invention is generally 0.25 to 0.6 g/cm$^3$, preferably at least 0.3 g/cm$^3$, more preferably at least 0.35 g/cm$^3$, in bulk density.

The term "pore volume" refers to the amount of N$_2$ adsorbed as determined by the N$_2$ adsorption method at a relative pressure of 0.931 and is used for pore volumes of up to 300 angstroms as determined by the Cranston-Inkley method. The shaped activated carbon of the present invention is generally 0.5 to 1.2 cm$^3$/g, preferably at least 0.6 cm$^3$/g, more preferably at least 0.65 cm$^3$/g, in pore volume. The pore volume can be determined using, for example, a device of CARLO ERBA SORPTO MATIC SERIES 1800.

The shaped activated carbon of the invention must further fulfill the requirement that the product of the bulk density multiplied by the pore volume should be in the range of 0.25 to 0.4 cm$^3$/cm$^3$. When the product is in this range, the activated carbon has high adsorptive capacity per unit volume and excellent strength. The product is preferably at least 0.27 cm$^3$/cm$^3$, more preferably at least 0.29 cm$^3$/cm$^3$.

With the shaped activated carbon of the invention, the surface area thereof is determined by the BET method. The carbon is generally at least 1000 m$^2$/g, preferably at least 1100 m$^2$/g, more preferably at least 1300 m$^2$/g, in surface area. With the activated carbon of the invention, the surface area is further limited in its relationship with the bulk density. More specifically, the product of the bulk density multiplied by the surface area is generally at least 400 m$^2$/cm$^3$, preferably at least 500 m$^2$/cm$^3$, more preferably at least 550 m$^2$/cm$^3$. The surface area can be measured with use of the same device as mentioned above for the determination of the pore volume.

The mean pore size of the shaped activated carbon of the invention is a value calculated from the pore volume and the surface area. The present carbon is generally 18 to 35 angstroms, preferably 19 to 30 angstroms, more preferably 20 to 28 angstroms, in mean pore size.

Butane working capacity of the carbon of the present invention is a value determined for 100 ml of a sample of the carbon with use of n-butane having a purity of at least 99.9%. The method of determination will be described in detail in Example 1 to be given later. The present activated carbon is generally 5.0 to 15 g/100 ml, preferably 8.0 to 15 g/100 ml, more preferably 9.0 to 15 g/100 ml, in the effective amount of butane adsorbed as determined by this method.

In particle size, the shaped activated carbon of the invention is suitably plus 50 mesh (as determined according to JIS using a screen with an opening size of at least 0.3 mm), preferably plus 36 mesh (using a screen with an opening size of at least 0.425 mm), more preferably plus 30 mesh (using a screen with an opening size of at least 0.5 mm).

The chemically activated shaped carbon of the present invention is suitable for adsorbing and desorbing hydrophobic organic compounds. The hydrophobic organic compounds to be adsorbed and desorbed are preferably those having solubility in water of up to 10 wt. % at 20° C. and a boiling point of $-5°$ C. to 170° C. Examples of such hydrophobic organic compounds are chain aliphatic saturated or unsaturated hydrocarbons having 4 to 8 carbon atoms (hereinafter expressed as "$C_4$–$C_8$"), $C_5$–$C_9$ alicyclic hydrocarbons, $C_6$–$C_9$ aromatic hydrocarbons, $C_1$–$C_6$ hydrocarbon halides, $C_4$–$C_8$ ethers, $C_5$–$C_7$ ketones, $C_3$–$C_8$ esters, etc.

More specific examples of such $C_4$–$C_8$ chain aliphatic saturated or unsaturated hydrocarbons are n-butane, n-pentane, n-hexane, isohexane, n-heptane, n-octane, isooctane(2,2,4-trimethylpentane), 2,2-dimethylbutane, 2-pentene and the like.

Examples of such $C_5$–$C_9$ alicyclic hydrocarbons are cyclohexane, methylcyclohexane and the like.

Examples of such $C_6$–$C_9$ aromatic hydrocarbons are benzene, toluene, o-xylene, m-xylene, p-xylene, ethylbenzene, isopropylbenzene and the like.

Examples of such $C_1$–$C_6$ hydrocarbon halides are methylene chloride, chloroform, carbon tetrachloride, ethyl chloride, ethylene chloride, ethylidene chloride, 1,1,1-trichloroethane, 1,1,2-trichloroethane, 1,1,1,2-tetrachloroethane, 1,1,2,2-tetrachloroethane, pentachloroethane, vinylidene chloride, 1,2-dichloroethane, trichloroethylene, tetrachloroethylene, 1,2,3-trichloropropane, isopropyl chloride, allyl chloride, 1,2-dichloropropane, butyl chloride, amyl chloride, o-chlorotoluene, p-chlorotoluene and the like.

Examples of such $C_4$–$C_8$ ethers are ethyl ether, n-butyl ether, epichlorohydrin, diglycidyl ether, furan and the like.

Examples of such $C_5$–$C_7$ ketones are methyl n-propyl ketone, methyl n-butyl ketone, methyl isobutyl ketone, methyl n-amyl ketone, diethyl ketone, ethyl n-butyl ketone, cyclohexanone, o-methylcyclohexanone and the like.

Examples of such $C_3$–$C_8$ esters are ethyl formate, propyl formate, n-butyl formate, isobutyl formate, amyl formate, ethyl acetate, n-propyl acetate, isopropyl acetate, n-butyl acetate, isobutyl acetate, sec-butyl acetate, n-amyl acetate, isoamyl acetate, ethyl butyrate and the like.

The starting material for preparing activated carbon by the process of the invention is a chemically activatable material, which is preferably a cellulosic material such as coconut shells, wood chips, saw dust or the like. Chemicals useful for activation are those generally used as such and already mentioned, among which zinc chloride and phosphoric acid are preferable, and more preferable is zinc chloride.

With the process of the present invention, the activating chemical is used in the form of a 40 to 70 wt. % aqueous solution. Concentrations less than 40 wt. % are not desirable since the reaction then requires a longer period of time. Concentrations over 70 wt. % present difficulty in uniformly mixing the starting carbon material and the activating chemical together, permit the reaction to proceed at a very high velocity and make it difficult to control the reaction. The carbon material and the aqueous chemical solution are mixed together in the ratio generally of 1/0.6 to 1/3.0, preferably 1/0.8 to 1/2.0, by dry solids weight.

The mixture of starting carbon material and aqueous solution of activating chemical is heated at 100° to 160° C. for reaction. The term "reaction" as used herein refers to the preparation of a black substance from the starting carbon material by decomposing and dehydrating the material under the action of the activating chemical.

The reaction must be conducted at a temperature of at least 100° C. to effect the removal of water. At a higher temperature, the reaction proceeds at a higher velocity, whereas at temperatures exceeding 160° C., the reaction proceeds excessively, making it impossible to shape the resulting reaction mixture.

With the process of the invention, the end point of the reaction is critical. One of the features of the present invention is to terminate the reaction at such a stage that the reaction mixture is most suited to shape. We have found it desirable to discontinue the reaction when the weight of the reaction mixture has become 90 to 115% of the dry weight of the starting mixture (dry weight of the starting carbon material +dry weight of the activating chemical). The term the "reaction mixture" refers to all the substances or materials present in the reaction system inclusive of water. Simultaneously when the starting carbon material becomes black, tar is formed which is thought to act as a binder during shaping and during activation through calcining, so that the reaction, if allowed to proceed excessively, eliminates the tar, makes the reaction mixture difficult to shape and fails to give shaped activated carbon retaining hardness and having a compact structure on calcining and activation. On the other hand, if the reaction is terminated too early, the reaction mixture contains a lesser quantity of tar and still retains a large amount of water, permitting the water to remain between the particles during shaping, with the result that the activated carbon obtained on calcining and activation is low in bulk density and in compactness.

Next, the reaction mixture is compactly shaped while being deaerated. The mixture is shaped while being heated at 90° to 160° C., whereby the tar resulting from the reaction is melted and allowed to remain between the particles as a binder, consequently giving a compacted shaped product.

If the mixture is shaped at a temperature below 90° C., the tar will not melt, failing to diffuse through the clearances between the particles and rendering the mixture difficult to shape. Furthermore, the product obtained upon calcining and activation is liable to disintegrate into particles. When the temperature is above 160° C., the liquid portion (tar and water) of the reaction mixture becomes separated from the solid portion thereof during the shaping step. This renders the mixture difficult to shape.

In the shaping step, the reaction mixture is deaerated by applying a pressure thereto with or without evacuation. A tableting machine, press, extruder or the like is used as the shaping device. While the foregoing conditions are employed for the mixture to be press-shaped with respect to the shaping temperature and the reaction end point, it is suitable in the case of extrusion that the shaping temperature be 90° to 130° C. and that the weight of the reaction mixture at the end point of the reaction be 100 to 115% of the dry weight of the starting mixture (dry weight of the starting carbon material + dry weight of the activating chemical). The shaped product can be in the form of tablets, plates, pellets, briquettes or the like, as optionally determined. Crushed type activated carbon can be obtained by crushing shaped activated carbon.

The shaped product is calcined for activation and then washed with an acid by methods which are generally employed for producing chemically activated carbon. For example, the product is calcined for carbonization in a rotary kiln at 500° to 700° C. for 10 minutes to 1 hour and is thereby activated, followed by washing and drying, whereby shaped activated carbon can be prepared.

The chemically activated shaped carbon obtained by the above process fulfills the foregoing requirements as to the properties such as bulk density, pore volume, surface area, mean pore size and effective amount of adsorption of butane.

The active carbon of the present invention can be further activated with a gas and thereby increased in the effective amount of adsorption of butane. The gas activation can be effected in the same manner as in the usual process for producing gas-activated shaped carbon. For example, water vapor or carbon dioxide is used as the activating gas at a gas partial pressure of 30 to 60% for calcining the carbon at 850° to 1000° C. for 10 minutes to 4 hours.

The chemically activated shaped carbon of the present invention is suitable for recovering hydrophobic organic compounds, such as those mentioned above, by repeated adsorption and desorption. The activated carbon is therefore usable, for example, for gasoline evaporation preventing devices (FIG. 1) for gasoline engines, solvent recovery processes (FIG. 2), etc.

Figure 1B:
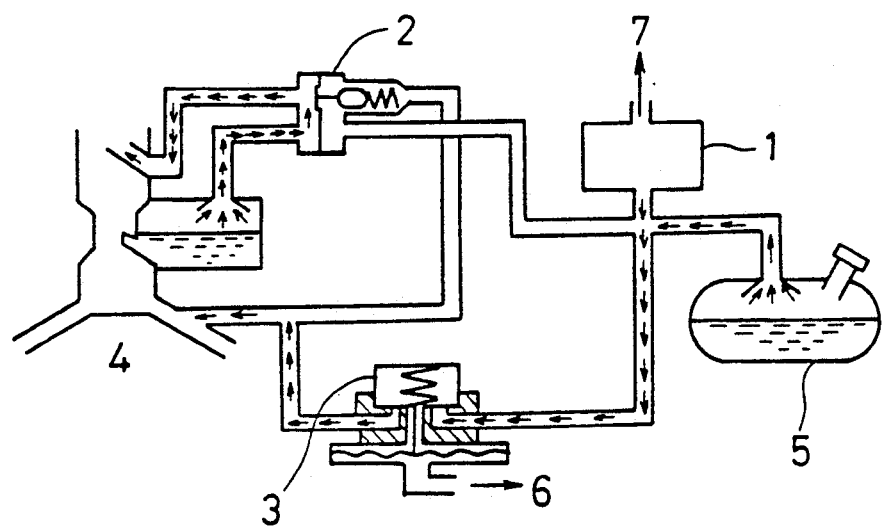

In the FIG. 1, 1 is activated carbon layer, 2 and 3 each are pressure regulating valves, 4 is intake manifold, 5 is gas tank, 6 is exhaust manifold, 7 is air cleaner, 8 is gas flow. In the FIG. 2, 11 is activated carbon layer, 12 is condenser, 13 is separator, 14 is steam, 15 is gas containing solvent, 16 is solvent, 17 is water, 18 is exhaust.

EXAMPLES

The present invention will be described in greater detail with reference to the following examples, which nevertheless in no way limit the invention.

EXAMPLE 1

Dry saw dust (1.3 kg) and 2.6 kg of an aqueous zinc chloride solution having a concentration of 50% were heated with stirring. The temperature of the mixture gradually rose to exceed 100° C., whereupon the mixture started to undergo a reaction with the evaporation of water. The reaction was allowed to proceed to prepare a black reaction mixture. Portions of reaction mixture with varying weights were obtained by changing the end point of the reaction. More specifically, reaction mixture portions were obtained which were altered from 82 to 136% stepwise in weight relative to the dry weight (taken as 100%) of the starting mixture of saw dust and zinc chloride solution.

With heating at 130° C., the reaction mixture was shaped into disks (30 cm in diameter and about 4 mm in thickness) by a press or shaped into tablets (5 mm in diameter and about 3 mm in thickness). The shaped pieces were placed into a crucible and calcined at 600° C. for 3 hours for activation.

The calcined product was washed with hydrochloric acid and then with water for the removal of zinc chloride, and was thereafter dried in the conventional manner. The dried product was crushed to 10 mesh to 28 mesh and checked for properties. Table 1 shows the results.

The experimental results (bulk density, crushing yield, shape) indicate that good results can be achieved when the weight at the reaction end point and the reaction temperature are 90 to 115% and up to 160° C., respectively.

TABLE 1

| Experiment No. | Shaping method | End-point wt. (%) | Max. temp. during reaction (°C.) | Bulk density (g/l) | Crushing yield (%) | Shape |
| --- | --- | --- | --- | --- | --- | --- |
| 1-1 | Press | 82 | 170 | 334 | 58 | No shape retentivity, readily became powder |
| 1-2 | Press | 85 | 165 | 374 | 64 | Partly became powdery |
| 1-3 | Press | 94 | 150 | 401 | 72 | Hard, slightly became powdery |
| 1-4 | Press | 102 | 130 | 443 | 73 | Very hard, remained in shape |
| 1-5 | Press | 111 | 125 | 441 | 73 | Very hard, remained in shape |

TABLE 1-continued

| Experiment No. | Shaping method | End-point wt. (%) | Max. temp. during reaction (°C.) | Bulk density (g/l) | Crushing yield (%) | Shape |
|---|---|---|---|---|---|---|
| 1-6 | Press | 118 | 120 | 407 | 71 | Slightly brittle, remained in shape |
| 1-7 | Press | 130 | 115 | 373 | 72 | Brittle, not became powdery |
| 1-8 | Press | 136 | 115 | 320 | 66 | No shape retentivity, not became powdery |
| 1-9 | Tableting | 82 | 170 | 336 | 62 | Readily became powdery |
| 1-10 | Tableting | 89 | 160 | 404 | 73 | Hard, slightly became powder |

The activated carbons of Exp. Nos. 1-4 and 1-5 were checked for the effective amount of adsorption of n-butane by the method stated below. The results are given below (Results)

|  | Experiment No. | |
|---|---|---|
|  | 1-4 | 1-5 |
| Amount of n-butane adsorbed (g/100 ml) | 16.1 | 16.0 |
| Amount of remaining n-butane (g/100 ml) | 7.2 | 7.2 |
| Effective amount of adsorption of n-butane (g/100 ml) | 8.9 | 8.8 |

The effective amount of adsorption of n-butane was determined by the following method.

1. The sample is dried at 150° C. for 3 hours and then cooled to room temperature in a desiccator.
2. The sample is packed in a glass column, 15.4 mm in inside diameter, to a height of 10 cm.
3. The column is sealed off, and the weight is measured (A g).
4. With the column set in a constant-temperature water bath at 25° C., n-butane (at least 99.9% in purity) is passed through the sample at a flow rate of 250 mg/min for 15 minutes (up flow).
5. The column is removed and checked for the weight (B g).
6. The column is then set in the device again, and dry air is passed through the sample (down flow) at 190 ml/min at 25° C. (10 BED vol/min) for 20 minutes.
7. The column is removed and checked for the weight (C g).
8. The above steps 4 to 7 are repeated four times, and the averages for 2 to 4 cycles are calculated.

$$\text{Amount of n-butane adsorbed (g/100 ml)} = \frac{\overline{B} - A}{V} \times 100$$

$$\text{Amount of remaining n-butane (g/100 ml)} = \frac{\overline{C} - A}{V} \times 100$$

$$\text{Effective amount of adsorption of n-butane (g/100 ml)} = \frac{\overline{B} - \overline{C}}{V} \times 100$$

$\overline{B}$ (g) = average of B values for 2 to 4 cycles
$\overline{C}$ (g) = average of C values for 2 to 4 cycles
$V$ (ml) = volume of the sample

EXAMPLE 2

The same reaction mixture as prepared in Example 1, 102% in weight at the end point of reaction, was shaped into disks by a press at varying temperatures of 50° to 200° C. The same procedure as in Example 1 was thereafter repeated to obtain shaped activated carbon, which was then checked for properties. Table 2 shows the results.

TABLE 2

| Exp. No. | Shaping temp. (°C.) | Bulk density (g/l) | Crushing yield (%) | Shape |
|---|---|---|---|---|
| 2-1 | 50 | * | 44 | Readily became powdery |
| 2-2 | 70 | 341 | 57 | Brittle, partly became powdery |
| 2-3 | 90 | 420 | 71 | Hard, remained in shape |
| 2-4 | 110 | 431 | 72 | Very hard, remained in shape |
| 2-5 | 130 | 443 | 73 | Very hard, remained in shape |
| 2-6 | 160 | 440 | 71 | Very hard, remained in shape |
| 2-7 | 170 | 393 | 63 | Became partly powdery |
| 2-8 | 200 | 373 | 60 | Readily became powdery |

Note
*Not measureable because the carbon collapsed into powder.

At 170° C. and 200° C., the liquid portion separated off. The reaction mixture was hardened at the portions thereof close to the press plates but became brittle at its central portion between the press plates.

The shaped activated carbons of Exp. Nos. 2-3, 2-4, 2-5 and 2-6 were checked for the effective amount of adsorption of n-butane in the same manner as above. The results are as follows:

| (Results) | Experiment No. | | | |
|---|---|---|---|---|
|  | 2-3 | 2-4 | 2-5 | 2-6 |
| Amount of n-butane adsorbed (g/100 ml) | 15.2 | 15.6 | 16.1 | 16.0 |
| Amount of remaining n-butane (g/100 ml) | 6.9 | 7.0 | 7.2 | 7.2 |
| Effective amount of adsorption of n-butane (g/100 ml) | 8.3 | 8.6 | 8.9 | 8.8 |

EXAMPLE 3

Dry coconut shell flour and an aqueous solution of zinc chloride were heated at 120° to 130° C. with stirring for reaction. (The proportion of zinc chloride was varied as shown in the table below, Nos. 1 to 8.) The reaction was terminated when the weight of each reaction mixture became 90 to 115% of the dry weight of the starting mixture, and the resulting reaction mixture was shaped into disks (30 cm in diameter and about 4 mm in thickness) at 130° C. by a press, then placed into a crucible and calcined at 600° C. for 3 hours for activation.

In the usual manner, each calcined product obtained was washed with hydrochloric acid and then with water for the removal of unreacted zinc chloride, and was thereafter dried.

The dried products (shaped activated carbons Nos. 1–8) where crushed to 10 mesh to 28 mesh and checked for properties. Table 3 shows the results.

TABLE 3

Effects of zinc chloride Press-shaping

| | Shaped activated carbon No. | | | | | | | |
|---|---|---|---|---|---|---|---|---|
| | 1 | 2 | 3 | 4 | 5 | 6 | 7 | 8 |
| Coconut shell flour [g] | 1300 | 1300 | 1300 | 1300 | 1300 | 1300 | 800 | 800 |
| Zinc chloride [g] | 780 | 1040 | 1170 | 1300 | 1430 | 1625 | 1200 | 1600 |
| Water [g] | 780 | 780 | 1040 | 1300 | 1040 | 1300 | 1200 | 1200 |
| Coconut shell flour [part] | 100 | 100 | 100 | 100 | 100 | 100 | 100 | 100 |
| Zinc chloride [part] | 60 | 80 | 90 | 100 | 110 | 125 | 150 | 200 |
| Water [part] | 60 | 60 | 80 | 100 | 80 | 100 | 150 | 150 |
| Endpoint weight [g] | 2030 | 2150 | 2415 | 2887.3 | 2709 | 3286.1 | 1987.1 | 2390 |
| Endpoint weight [%] | 97.6 | 91.9 | 97.8 | 111.1 | 99.2 | 112.3 | 99.4 | 99.6 |
| Bulk density [g/l] | 540 | 479 | 452 | 441 | 440 | 377 | 369 | 325 |
| Surface area [m$^2$/g] | 1102 | 1315 | 1354 | 1458 | 1399 | 1473 | 1310 | 1466 |
| Pore volume [ml/g] | 0.513 | 0.618 | 0.653 | 0.717 | 0.726 | 0.804 | 0.879 | 1.066 |
| Mean pore size [Å] | 18.6 | 18.8 | 19.3 | 19.7 | 20.8 | 21.8 | 26.8 | 29.1 |
| Surface area [m$^2$/ml] | 595 | 630 | 612 | 643 | 616 | 555 | 483 | 476 |
| Pore volume [ml/ml] | 0.277 | 0.296 | 0.295 | 0.316 | 0.319 | 0.303 | 0.324 | 0.346 |
| Amount of n-butane adsorbed [g/100 ml] | 14.0 | 15.2 | 15.2 | 16.0 | 16.6 | 15.3 | 15.5 | 16.5 |
| Amount of remaining n-butane [g/100 ml] | 7.9 | 7.4 | 7.1 | 7.2 | 6.9 | 5.6 | 4.6 | 4.2 |
| Effective amount of adsorption of n-butane [g/100 ml] | 6.1 | 7.8 | 8.1 | 8.8 | 9.7 | 9.7 | 10.9 | 12.3 |

Consequently, as the proportion of zinc chloride increased, the mean pore size increased, the pore volume increased and the bulk density decreased because of the increase in the pore volume.

(For reference, common carbon prepared from coconut shells and activated with water vapor is up to 6.0 g/100 ml in the effective amount of adsorption of n-butane, and other activated carbons commercially available and great in the effective amount of adsorption of n-butane are about 8 g/100 ml in this value.)

The mean pore size (angstroms) was calculated from [4×pore volume (ml/ml)/surface area (m$^2$/ml)]×10$^4$.

EXAMPLE 4

Dry saw dust (10 g) and 20 g of 50% aqueous solution of zinc chloride were thoroughly mixed together with a spurtle in a 500-c.c. beaker, held in a constant-temperature dryer for 24 hours and then checked for the resulting change in weight (i.e. the weight of the resulting mixture based on the dry weight of the starting mixture of saw dust and zinc chloride, as expressed in percentage) and also for the degree of reaction. This procedure was repeated at varying dryer temperatures of 70° to 200° C. as listed in Table 4, which also shows the results.

TABLE 4

| Sample | Dryer temp. (°C.) | Weight (%) | Degree of reaction (state of mixture) |
|---|---|---|---|
| A | 70 | 134 | No reaction |
| B | 80 | 129 | No reaction |
| C | 90 | 128 | Slightly became black but no progress in reaction |
| D | 100 | 111 | Became black |
| E | 110 | 91 | " |
| F | 130 | 83 | " |
| G | 150 | 82 | " |
| H | 200 | 82 | " |

Each mixture was then shaped into tablets (6 mm in diameter and about 3 mm in thickness) with heating at 130° C. as in Example 1. Although samples C, D and E were shapable, samples A, B, F, G and H were not shapable. Samples C, D and E were calcined at 600° C. for 1 hour for activation, whereby samples D and E were each made into shaped activated carbon of high strength, whereas sample C gave a product which was low in strength and brittle.

EXAMPLE 5

Dry saw dust (1.3 kg) and 2.6 kg of an aqueous zinc chloride solution having a concentration of 50% were heated with stirring. The temperature of the mixture, rising gradually, was controlled by varying the degree of vacuum. The reaction mixture was then shaped with a press in the same manner as in Example 1, calcined in a crucible at 600° C., washed with acid and water, crushed and checked for properties. Table 5 below shows the results, which indicate that reaction temperatures of above 100° C. afford good results.

TABLE 5

| Experiment No. | Endpoint wt. (%) | Max. temp. during reaction (°C.) | Bulk density (g/l) | Crushing yield (%) | Shape |
|---|---|---|---|---|---|
| 4-1 | 123 | 87 | — | — | Not shapable |
| 4-2 | 106 | 89 | — | — | " |
| 4-3 | 102 | 90 | — | — | " |
| 4-4 | 104 | 94 | 303 | 45 | No shape retentivity, readily became powdery |
| 4-5 | 107 | 102 | 432 | 71 | Very hard, remained in shape |
| 4-6 | 105 | 106 | 441 | 74 | Very hard, remained in |

TABLE 5-continued

| Experiment No. | End-point wt. (%) | Max. temp. during reaction (°C.) | Bulk density (g/l) | Crushing yield (%) | Shape |
|---|---|---|---|---|---|
| 4-7 | 119 | 113 | 386 | 69 | Slightly brittle, but not became powdery shape |
| 4-8 | 103 | 122 | 441 | 72 | Very hard, remained in shape |

The activated carbons with Exp. Nos. 4-5, 4-6 and 4-8 given above were checked for the effective amount of adsorption of n-butane by the method already described. The results are as follows.

(Results)

|  | Experiment No. | | |
|---|---|---|---|
|  | 4-5 | 4-6 | 4-8 |
| Amount of n-butane adsorbed (g/100 ml) | 15.7 | 16.1 | 16.0 |
| Amount of remaining n-butane (g/100 ml) | 7.0 | 7.1 | 7.2 |
| Effective amount of adsorption of n-butane (g/100 ml) | 8.7 | 9.0 | 8.8 |

EXAMPLE 6

The active carbon prepared in Example 3 using 110 parts of zinc chloride was further activated with water vapor under the conditions of Table 6 below. Table 6 also shows the properties of the product. The activation with water vapor for 1.5 hours increased the amount of n-butane adsorbed and the effective amount of adsorption of n-butane by about 12%.

TABLE 6

| Influence of activation | (ZnCl$_2$ 110 parts) | | | |
|---|---|---|---|---|
| Activation temperature (°C.) | 950 | 950 | 950 | 950 |
| Activation time (hr) | 0.0 | 0.5 | 1.0 | 1.5 |
| Charge (g) | 150.0 | 150.0 | 150.0 | 150.0 |
| Output (g) | 123.8 | 121.0 | 95.3 | 84.2 |
| Yield (%) | 82.5 | 80.7 | 63.5 | 56.1 |
| Yield (heat treatment base, %) | 100.0 | 97.7 | 77.0 | 68.0 |
| Bulk density (g/l) | 463 | 450 | 387 | 363 |
| Surface area (m$^2$/g) | 1273 | 1363 | 1620 | 1758 |
| Pore volume (ml/g) | 0.653 | 0.723 | 0.889 | 0.987 |
| Mean pore size (angstroms) | 20.5 | 21.2 | 22.0 | 22.5 |
| Surface area (m$^2$/ml) | 589 | 613 | 627 | 638 |
| Pore volume (ml/ml) | 0.302 | 0.325 | 0.344 | 0.358 |
| Amount of n-butane adsorbed (g/100 ml) | 17.4 | 15.7 | 17.9 | 18.6 |
| Amount of remaining n-butane (g/100 ml) | 7.8 | 7.3 | 7.7 | 7.7 |
| Effective amount of adsorption of n-butane (g/100 ml) | 9.6 | 8.4 | 10.2 | 10.9 |

EXAMPLE 7

Shaped activated carbon No. 8 prepared in Example 3 was tested for equilibrium adsorption of the five kinds of organic solvents listed below. The amount of equilibrium adsorption (wet %) was determined at 25° C. and 100° C. using nitrogen containing 0.1 vol. % of each organic solvent. The condition of 25° C., 0.1 vol. % is typical of usual conditions under which common organic solvents are adsorbed. The condition of 100° C., 0.1 vol. % is typical of usual conditions under which common organic solvents are desorbed. Accordingly, the greater the difference (effective amount of adsorption) in the amount of adsorption between 25° C. and 100° C., the more suitable is the activated carbon for the recovery of organic solvents.

For comparison, activated carbon (particulate SHIRASAGI (S$_2$×4/6)) for recovering usual solvents was also similarly tested. Table 7 below shows the results.

TABLE 7

| Active carbon | No. 8 | | Comparative | |
|---|---|---|---|---|
| N$_2$ containing 0.1 vol. % of solvent | 25° C. (wet %) | 100° C. (wet %) | 25° C. (wet %) | 100° C. (wet %) |
| Cyclohexane | 40.5 | 6.0 | 25.7 | 11.7 |
| MIBK* | 58.8 | 7.4 | 37.3 | 16.4 |
| n-Heptane | 45.9 | 8.5 | 29.1 | 17.7 |
| p-Xylene | 59.6 | 13.4 | 37.8 | 28.3 |
| Benzene | 45.4 | 6.1 | 28.8 | 11.6 |

*MIBK: methyl isobutyl ketone

The above results reveal that shaped activated carbon No. 8 is greater than the comparative activated carbon in the effective amount of adsorption of any of the organic solvents.

What is claimed is:

1. A process of recovering hydrophobic organic compounds which comprises contacting a chemically activated shaped carbon with a hydrophobic organic compound to repeatedly absorb and desorb said hydrophobic organic and recovering it, said chemically activated shaped carbon produced by heating and reacting at 100° to 160° C. a mixture of a chemically activatable starting material selected from the group consisting of coconut shells, wood chips and saw dust, and 40 to 70% by weight of an aqueous solution of an activating chemical comprising zinc chloride in a ratio of 1/0.6 to 1/3.0 by dry weight of the activatable starting material to the activating chemical, shaping the reaction mixture at a temperature of 90° to 160° C. when the total weight of the reaction mixture has become 90 to 115% of the dry weight of the solids in the mixture before heating, thereafter calcining, washing and drying the shaped product followed by further activating the shaped product with a gas to thereby obtain a shaped chemically activated carbon, said shaped chemically activated carbon having such properties that it has a bulk density of 0.25 to 0.6 g/cm$^3$, a pore volume of 0.65 to 1.2 cm$^3$/g, a bulk density×pore volume of 0.25 to 0.4 cm$^3$/cm$^3$, a surface area of at least 1000 m$^2$/g, a mean pore size of 18 to 35 angstroms, a bulk density×surface area of at least 400 m$^2$/cm$^3$, and which chemically activated carbon effectively adsorbs butane in an amount of 8.0 to 15 g/100 ml.

* * * * *